US005920423A

United States Patent [19]
Grubb et al.

[11] Patent Number: 5,920,423
[45] Date of Patent: Jul. 6, 1999

[54] MULTIPLE PUMPED FIBER AMPLIFIERS FOR WDM COMMUNICATION SYSTEMS WITH ADJUSTMENT FOR THE AMPLIFIER SIGNAL GAIN BANDWIDTH

[75] Inventors: Stephen G. Grubb, Fremont; Bernard G. Fidric, Cupertino, both of Calif.

[73] Assignee: SDL, Inc., San Jose, Calif.

[21] Appl. No.: 08/986,222

[22] Filed: Dec. 5, 1997

[51] Int. Cl.$^6$ ............................... H01S 3/10; H01S 3/30; G02B 6/26

[52] U.S. Cl. ..................... 359/341; 359/160; 359/337; 359/345

[58] Field of Search ..................... 359/134, 160, 359/337, 341, 345; 372/6, 70

[56] References Cited

U.S. PATENT DOCUMENTS

| | | | |
|---|---|---|---|
| 5,241,414 | 8/1993 | Giles et al. | 359/341 |
| 5,485,481 | 1/1996 | Ventrudo et al. | 372/6 |
| 5,568,497 | 10/1996 | Bishop et al. | 372/40 |
| 5,673,280 | 9/1997 | Grubb et al. | 372/6 |
| 5,721,636 | 2/1998 | Erdogan et al. | 359/341 |
| 5,774,484 | 6/1998 | Wyatt et al. | 372/6 |

OTHER PUBLICATIONS

Kevin W. Bennett entitled "980 nm band pump spectrum wavelength tuning of the gain spectrum of EDFAs", OAA '97, Optical Amplifiers and Their Applications, paper PD4, pp. PD4–1thru PD4–4.

Chirravuri et al, Proc. SPIE, vol. 1789, pp. 214–219; abst. only herewith, Sep. 11, 1992.

Yoshio et al, Proc. 1997 Conf. Opt. Fibr. Communic; Feb. 21, 1997, pp. 107–108.

*Primary Examiner*—Welson Moskowitz
*Attorney, Agent, or Firm*—W. Douglas Carothers, Jr.

[57] ABSTRACT

A WDM communication system utilizes a pump-mediated gain-shaped fiber amplifier having a predetermined nominal signal gain bandwidth and is pumped by a plurality of laser pump sources having different wavelength outputs with their outputs combined to provide a scaled power output of a weighted average of their wavelengths for launching into at least one end of the fiber amplifier. The weighted average of the output wavelengths of the individual sources is varied to produced a modified weighted average that broadens the predetermined nominal signal gain bandwidth. The wavelength weighted average of the combined pump sources may be modified by changing the operation of at least one of the pump laser sources, e.g., by changing the power level or the temperature level of one or more of the individual pump sources or by terminating the operation of one or of the individual pump sources. The amplifier may then be employed in a multiple channel DWDM communication system with broadened signal gain bandwidth permitting the expansion of the number of possible communication channels utilized with the amplifier.

29 Claims, 5 Drawing Sheets

MULTIPLE PUMPED FIBER AMPLIFIERS FOR WDM COMMUNICATION SYSTEMS WITH ADJUSTMENT FOR THE AMPLIFIER SIGNAL GAIN BANDWIDTH

FIELD OF THE INVENTION

This invention relates generally to optical fiber amplifiers and WDM communication systems utilizing such fiber amplifiers and, more particularly, to enhancing optical fiber amplifiers to have broader signal gain bandwidth response in such systems.

BACKGROUND OF THE INVENTION

A concern in the use of optical fiber amplifiers is to enhance the amplifier gain flatness across the amplifier nominal signal gain bandwidth which is critical for WDM optical communications, particularly for dense WDM (DWDM) communications. Also, in the case of single-channel analog (CATV) applications, the combination of source chirp and gain tilt results in signal distortion. Thus, gain slope should be minimized as well. Previously published results indicated that for erbium doped fiber amplifiers (EDFAs), gain saturation was essentially homogeneous. Hence, the varying of pump wavelength in the 980 nm band, for example, would only affect the overall gain level regardless of the signal wavelength and the noise figure of the fiber amplifier. Recently, however, in the article of Kevin W. Bennett et al. entitled, "980 nm Band Pump Wavelength Tuning of the Gain Spectrum of EDFAs", OAA '97, Optical Amplifiers and Their Applications, page 13 et al., paper PD4, which is incorporated herein by its reference, it was demonstrated that the changing of pump wavelength of a single pump source to a fiber amplifier, such as by varying pump drive current or by adjustment of pump laser temperature, can be sufficient to alter the gain spectrum of an EDFA and, in some cases to extend the gain flat dynamic range of an EDFA.

What is further desired is to provide independent adjustment of the relative power level over a plurality of amplifier pumps, operating at different wavelengths within an absorption band of the fiber amplifier pumped by the amplifier pumps, to change the weighted average or the effective combined wavelength of the combined pump wavelengths to modify the amplifier gain profile, in particular, flatten the gain profile or minimize its gain tilt.

Thus, it is an object of this invention to provide a fiber amplifier optimized for gain flatness.

It is another object of this invention to utilize co-propagating pump sources or a combination of co-propagating and counter-propagating pump sources in a manner to achieve improved signal gain response across the signal gain bandwidth of the amplifier.

SUMMARY OF THE INVENTION

According to this invention, the gain flatness across the nominal signal gain bandwidth and gain flatness of a fiber amplifier may be broadened by controlling the weighted average wavelength of combined, plural pump sources of different pump wavelengths so that the nominal signal gain bandwidth of the fiber amplifier can be adjusted over a wide range of signal input levels to achieve a weighted average wavelength that broadens the amplifier nominal signal gain bandwidth. This is especially important for DWDM communication systems and WDM add/drop systems where input signal levels can widely vary. Also, the amplifier can maintain noise figure and gain flatness under much higher input signal conditions.

A DWDM communication system comprising this invention utilizes a pump-mediated gain-shaped fiber amplifier having a predetermined nominal signal gain bandwidth and is pumped by a plurality of laser pump sources having different wavelength outputs with their outputs combined to provide a scaled power output of a weighted average of their wavelengths for launching into at least one end of the fiber amplifier. The weighted average of the output wavelengths of the individual sources is varied to produce a modified weighted average that broadens the predetermined nominal signal gain bandwidth. The wavelength weighted average of the combined pump sources may be modified by changing the operation of at least one of the pump laser sources, e.g., by changing the power level or the temperature level of one or more of the individual pump sources or by terminating the operation of one or of the individual pump sources. The amplifier may then be employed in a multiple channel DWDM communication system with broadened-signal gain bandwidth permitting the expansion of the number of possible communication channels utilized with the amplifier.

The power levels of the plural co-propagating pumps, or plural counter-propagating pumps or plural bidirectionally propagating pumps of the optical amplifier may be selectively changed to change their weighted average, i.e., the effective combined output wavelength, to modify the nominal signal gain bandwidth of the fiber amplifier, e.g., to broaden the nominal signal gain bandwidth or to reduce the gain tilt of gain spectrum of the fiber amplifier. Thus, by changing the effective combined wavelength of the pump light, the signal gain spectrum in the amplifier may be modified in a desired manner.

Other objects and attainments together with a fuller understanding of the invention will become apparent and appreciated by referring to the following description and claims taken in conjunction with the accompanying drawings.

BRIEF DESCRIPTION OF THE DRAWINGS

FIG. 7 is a schematic view of a fiber amplifier according to another embodiment of this invention an optical fiber amplifier with a multiple wavelength pump source that is

3 adjusted to achieve broadened nominal signal gain bandwidth and gain flatness according to this invention.

DETAILED DESCRIPTION OF THE PREFERRED EMBODIMENTS OF THE INVENTION

Figure 1:
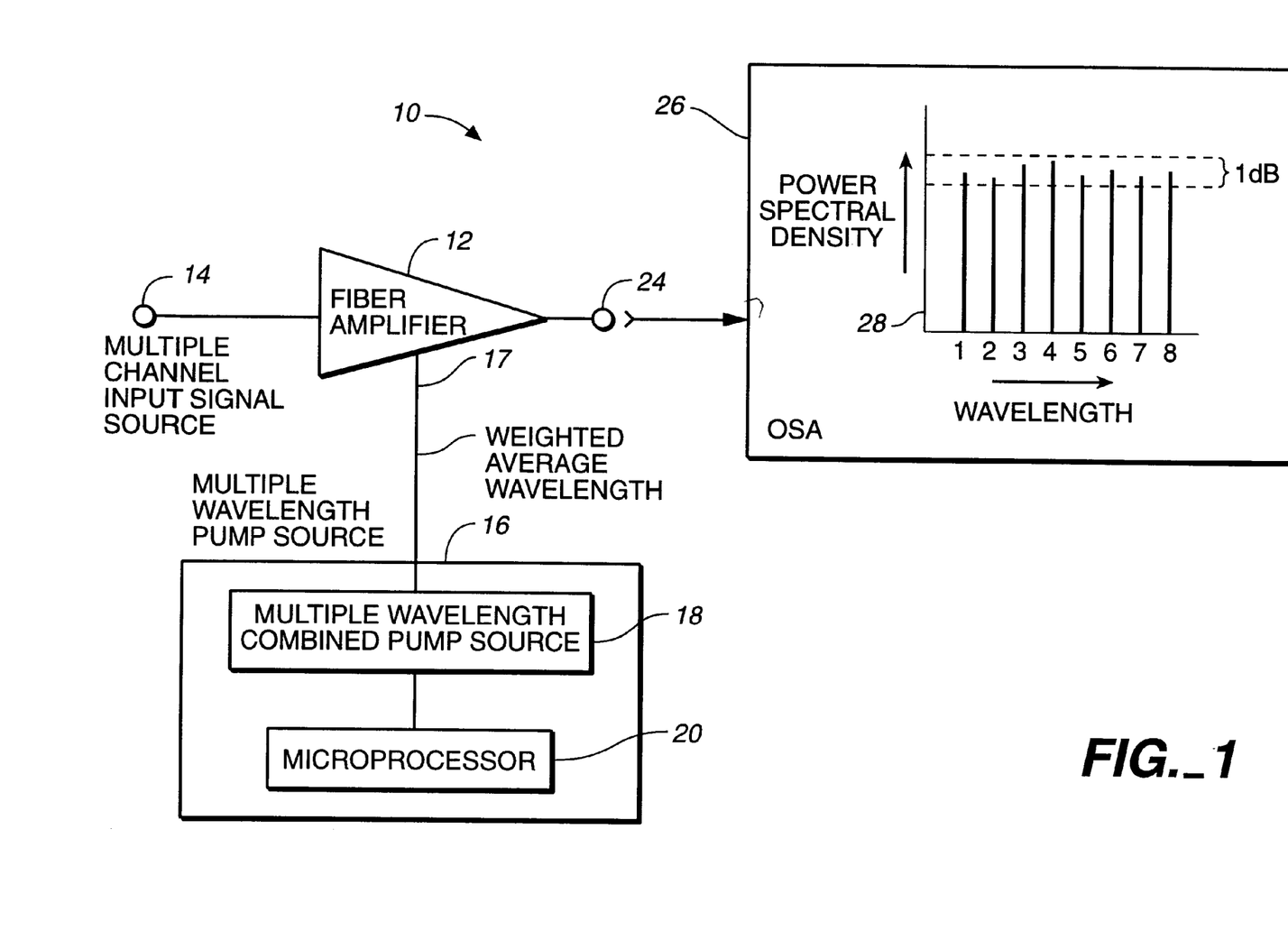
FIG. 1 is schematic view of an optical fiber amplifier with a multiple wavelength pump source that is adjusted to achieve broadened nominal signal gain bandwidth and gain flatness according to this invention.

Reference is now made to this invention as shown in FIG. 1. In FIG. 1, DWDM communication system 10 comprises fiber amplifier 12, doped with a rare earth impurity such as Er or Er/Yb, for amplifying one or more input signals from signal or channel source 14 which are provided as an amplified output signal or signals at output 24. The multiple signal wavelengths at input 14 are within the nominal signal gain bandwidth of amplifier 12 and comprise a series of communication channels in connection with DWDM communication system 10. The multiple wavelength signals at source 14 may be employed to test the signal gain bandwidth response for amplifier 12 for different combined pump wavelength inputs to broaden the nominal signal gain bandwidth of amplifier 12 as well as later providing a multiple channel modulated signal source for amplification and transmission. Multiple wavelength pump source 16 comprises a plurality of individual pump sources 18, that may be semiconductor laser diode sources or fiber laser sources. Pump sources 18 provide for spatially different wavelength outputs that are WDM combined to provide a combined output which is a weighted average of their combined wavelengths of operation. A microprocessor 20 is coupled to sources 18 at input 19 for the purpose of individually controlling their operation in a manner to provide a variation in the weighted average wavelength on pump input 17 to amplifier 12. Thus, the weighted average of the combined pump wavelengths can be adjusted to achieve maximum broadening of the gain flatness of the amplifier gain profile available for signal amplification, i.e., broaden its nominal signal gain bandwidth, or lowering of its gain slope, i.e., reducing its gain tilt, so that enhancement of the nominal signal gain bandwidth for amplifier 12 is achieved. The weighted average of the wavelength output of pump sources 18 may be varied by changing the power levels applied to the individual pump sources or by changing the temperature of operation of the individual pump sources where those pump sources are laser diode sources. Testing for maximized nominal signal gain bandwidth via multiple wavelength pump source 16 is accomplished with the use of microprocessor 20 that is programmed to vary the weighted average of the individual wavelengths of operation of pump sources 18 for a given signal wavelength. By continuously changing the input signal wavelength for a sequence of operation of microprocessor 20 for each given input signal change, changes in the extent of the nominal signal gain bandwidth can be achieved. With testing for the nominal bandwidth, broadening of that bandwidth can be realized through multiple adjusted weighted average wavelengths of operation of multiple wavelength pump source 16 through the aid of microprocessor 20. Upon achieving a wavelength weighted average from source 16 that provides for a optimized broadening of the signal gain bandwidth for the particular fiber amplifier 12, the number of possible signal channels is increased in the use of amplifier 12 in a DWDM system.

As a particular example, DWDM system 10 may be an 8 channel communication system, although 12, 32 and 64 channel systems are equally applicable. The 8 channel modulated wavelength signals within the gain spectral bandwidth of amplifier 12 are provided at signal source input 14, and their outputs appearing at output 24 are coupled to an optical spectrum analyzer (OSA) 26 to analyze the power spectral densities of these signals for desired signal specifications, such as, within the broadened nominal peak-to-peak variation of the output power of the eight modulated channels 1–8 shown on screen 28 of OSA 26 all remain within a defined level, such as with 1 dB as illustrated in screen 28.

Figure 2:
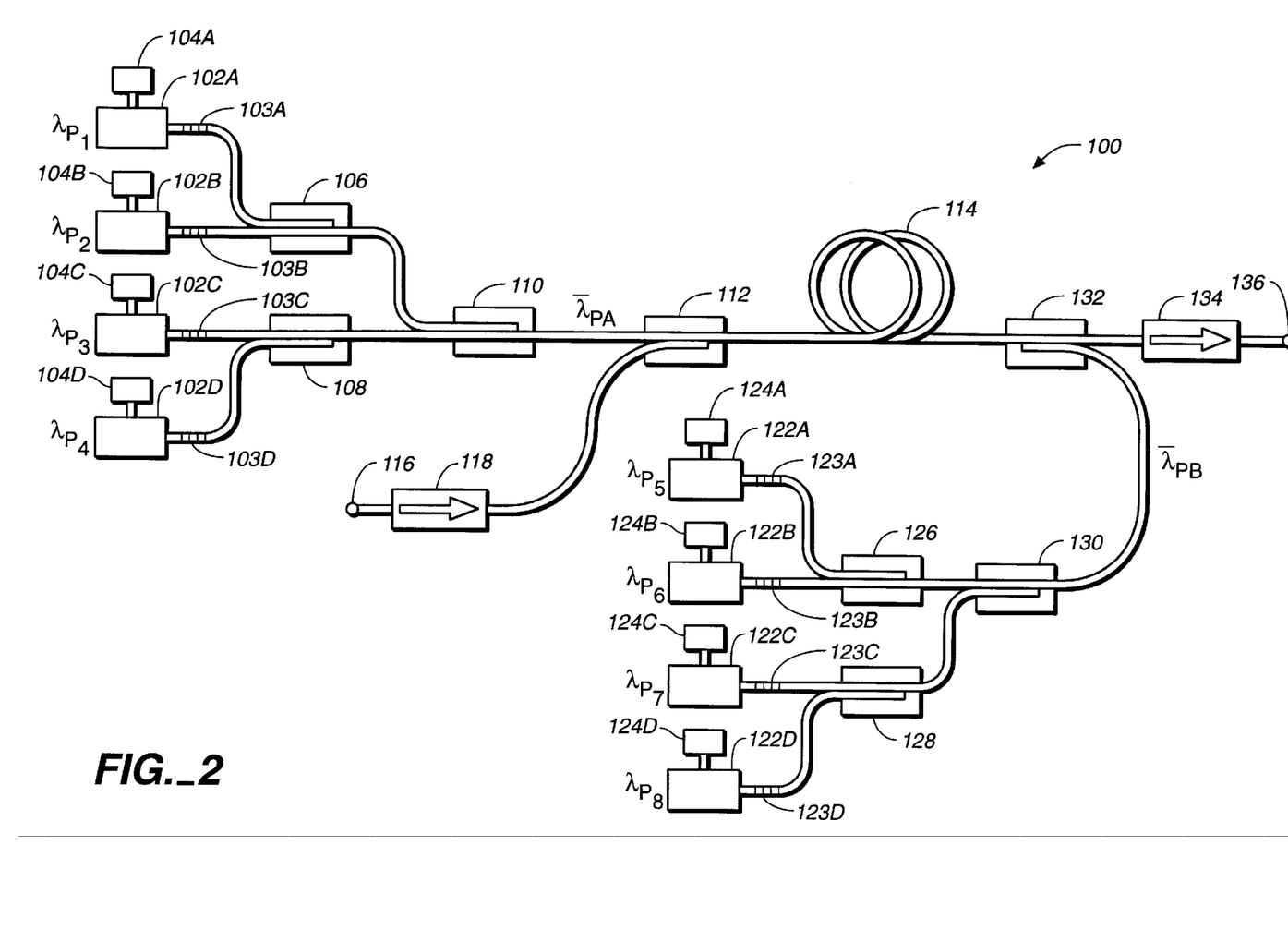
FIG. 2 is a schematic view of a fiber amplifier according to one embodiment of this invention employing multiple pump sources that are independently controlled to change their power levels in order to modify the amplifier gain profile to achieve broadened nominal signal gain bandwidth.

Reference is now made to FIG. 2 which illustrates a first more specific embodiment according to this invention. In FIG. 2 control over the composite gain profile is achieved by independently adjusting the relative power level of a plurality of pump sources to the amplifier so as to change the effective (weighted average) wavelength of the pump light to modify or tailor the amplifier gain profile in a desired manner, such as flattened or monotonically decreasing or monotonically increasing across the length of the fiber, or any other gain profile desired across the signal wavelength band. Since gain flatness is critical for WDM optical communication systems and gain slope should be minimized in CATV applications by broadening out, for example, the gain profile, adjustment toward flattening the gain profile and broadening of the gain slope, i.e., reducing gain tilt, may be achieved through variation of the relative power levels of plural pump sources to the amplifier. The gain flatness of the fiber amplifier may be continuously adjusted over a wide range of signal input levels. This is especially important for WDM add/drop systems where the input signal levels can vary widely. Moreover, as higher capacity amplifier systems are designed and higher input signal conditions are desired or required, amplifier flatness and noise figure can be continuously adjusted to enhance the signal gain shape or profile over a wide dynamic range of wavelengths and signal power levels.

In FIG. 2, amplifier system 100 comprises fiber amplifier 114 pumped by four WDM combined co-propagating laser pumps 102A–102D having stabilized wavelength outputs of $\lambda_{P1}$, $\lambda_{P2}$, $\lambda_{P3}$ and $\lambda_{P4}$. Light outputs from pumps 102A and 102B are combined via WDM coupler 106 while light outputs from pumps 102C and 102D are combined via WDM coupler 108. The combined outputs of couplers 106 and 108 are then WDM combined via WDM coupler 110. A signal at input 116 is provided as input to fiber amplifier through optical isolator 118 for amplification in amplifier 114, and is combined, via coupler 112, with the WDM combined pump output from coupler 110. As an example, amplifier 114 may be an Er doped fiber and pumps 102A–102D may be laser diode pump modules with output gratings 103A–103D to provide spatially different, stabilized wavelengths of 970 nm, 975 nm, 980 nm and 985 nm. Such pump modules are disclosed in U.S. patent to Ventrudo et al., U.S. Pat. No. 5,485,481, which is incorporated herein by its reference and are available for SDL, Inc. of San Jose, Calif. as Series 2000 fiber Bragg grating stabilized 980 nm pump modules. The input signals to be amplified may be a plurality of wavelength channels within the 1550 nm band. Couplers 106, 108 and 110, as well as couplers 126, 128 and 130, may be fused biconical couplers capable of combining pairs or groups of wavelengths with 5 nm wavelength separations or larger. Amplifier 114 may be single mode fiber or double clad fiber in which case, couplers 112 and 132 may be substituted with other appropriate couplers to launch the pump light into the inner cladding of the fiber and signal 116 into the core, e.g., dichoric mirrors and lens system as known in the art.

Amplifier system 100 is pumped also by four combined counter-propagating laser pumps 122A–122D having stabilized wavelength outputs of $\lambda_{P5}$, $\lambda_{P6}$, $\lambda_{P7}$ and $\lambda_{P8}$. Light outputs from pumps 122A and 122B are combined via WDM coupler 126 while light outputs from pumps 122C and 122D are combined via WDM coupler 128. The combined outputs of couplers 126 and 128 are WDM combined via WDM coupler 130. Continuing the example of the previous paragraph, pumps 102A–102D may be laser diode pump modules with output gratings 123A–123D to provide spatially different, stabilized wavelengths of 1470 nm, 1475 nm, 1480 nm and 1485 nm. The combined WDM output from coupler 130 is launched in the counter direction to signal 116 in fiber 114 via coupler 132. The amplified signal 116 from amplifier 114 is provided, via optical isolator 134, at output 136.

An important aspect of this invention is that each of the pump sources 102A–102D and 122A–122D are provided with an independent control of their individual power levels via controls 104A–104D and 124A–124D, respectively, through which the current or bias on the respective laser modules may be individually varied. A variance of their individual power levels provides an effective means for varying the combined effective wavelength of the WDM combined pump power at the output of couplers 110 and 130 for input to amplifier 114 via optical couplers 112 and 132. The effective wavelength, $\bar{\lambda}_P$, of the combined outputs is the weighted average of the combined wavelengths, the resulting value of which depends upon the applied input power of the several individual laser modules. The effective pump wavelength, $\bar{\lambda}_P$, output to amplifier 114 can be adjusted to provide a weighted average wavelength that provides for enhanced broadening of the signal gain response curve or lowering of the gain tilt of the signal gain response curve. Thus, the pump power to the amplifier may be scaled through combined pumps in combination with variation of the applied power to individual pumps to vary the weighted average of their combined wavelength output to enhance the signal gain profile in amplifier 114 since this gain profile is a function of pump wavelength. The weighted average wavelength in the cases of the combined pumps 102A–102D and 122A–122D in FIG. 2 is respectively shown as $\bar{\lambda}_{PA}$ and $\bar{\lambda}_{PB}$.

The weighted average or effective pump wavelength, $\bar{\lambda}_P$, of a group of pump modules is the inverse of the weighted frequency, $\bar{v}$, as per the following:

$$\bar{\lambda}_P = \frac{c}{\bar{v}}$$

where c is the velocity of light.

The weighted average frequency, $\bar{v}$, is the sum of the frequencies of the pump module group as weighted by their respective powers over their total power, which can be expressed as follows:

$$\bar{v} = \frac{\Sigma v_i P_i}{\Sigma P_i}.$$

Figure 3:
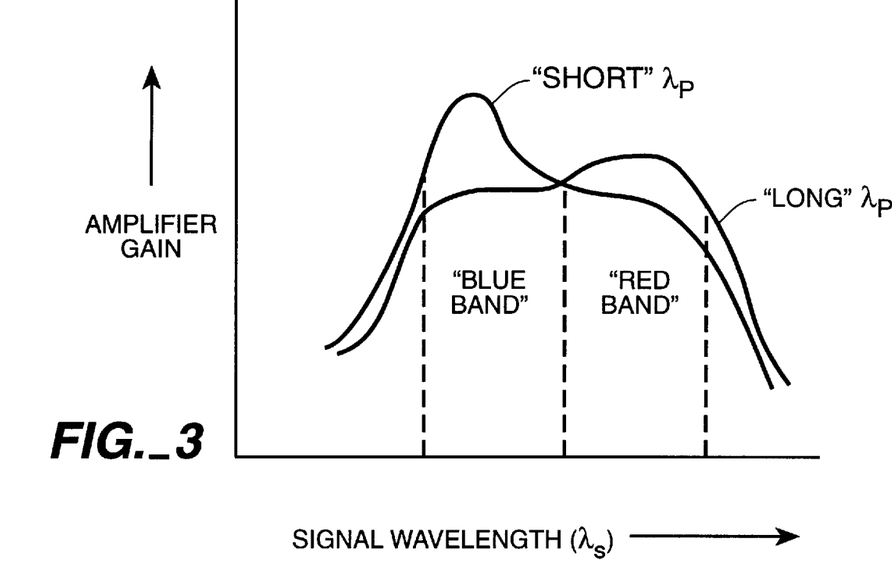
FIG. 3 is a graphic illustration of amplifier gain versus signal wavelength for different pump wavelengths.

As expressed in Bennett et al., the gain distortions for shorter pump wavelengths ("short" $\lambda_P$ in FIG. 3) and for longer pump wavelengths ("long" $\lambda_P$ in FIG. 3) over the signal wavelength band of the signal are different. In FIG. 3, the short and long pump wavelengths may be, respectively, the 980 band and the 1480 band in the example above. Thus, in order to achieve the pump gain profile suitable within each band in the 1550 nm signal gain bandwidth comprising the "blue" band and the "red" band, as shown in FIG. 3, the signal gain profile in amplifier 114 can be enhanced by selecting the weighted average pump wavelength, $\bar{\lambda}_{PA}$, in the short pump wavelength band and the weighted average pump wavelength, $\bar{\lambda}_{PB}$, in the long pump wavelength band that provides for the most enhancement in both cases of the signal gain response curve or broadening of the signal gain response curve enhancing the gain spectra with lower noise figure.

Figure 4:
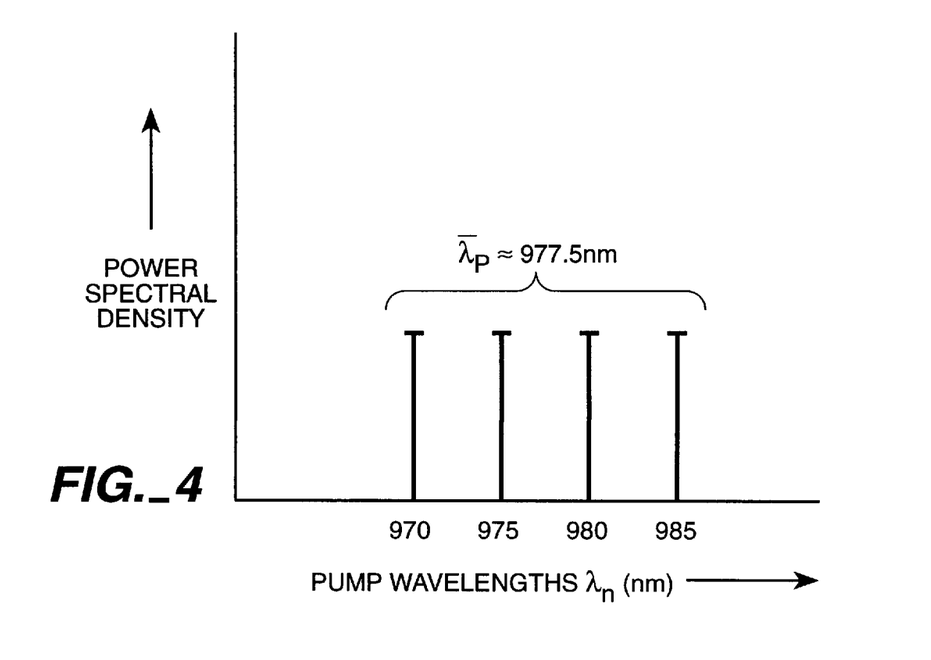
FIG. 4 is a graphic illustration of power spectral density versus pump wavelengths where the adjust power level of the different output wavelength pumps are the same.
Figure 5:
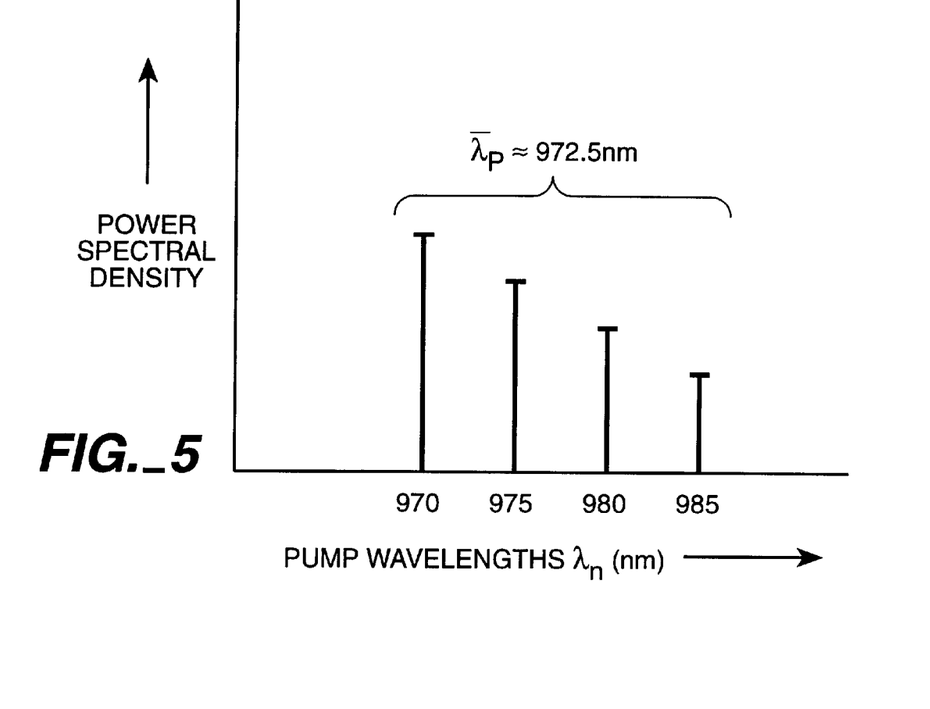
FIG. 5 is a graphic illustration of power spectral density versus pump wavelengths where the adjust power level of the different output wavelength pumps are monotonically decreasing.
Figure 6:
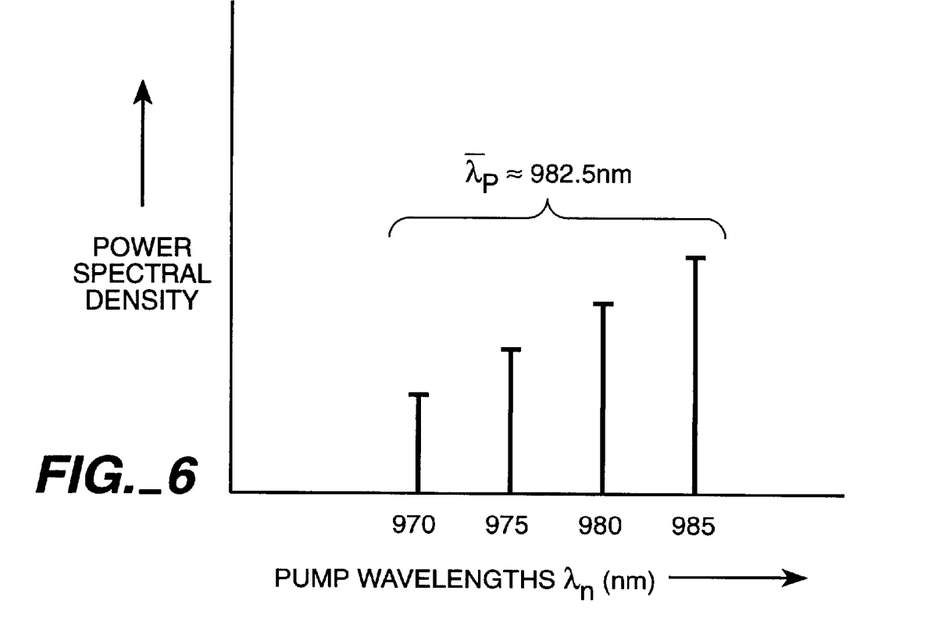
FIG. 6 is a graphic illustration of power spectral density versus pump wavelengths where the adjust power level of the different output wavelength pumps are montonically increasing.

The selection process is addressed in FIGS. 4–6 with respect to one set of pumps within the "short" $\lambda_P$ band shown in FIG. 3. FIGS. 4–6 show the power spectral density versus pump wavelengths, $\lambda_n$. In FIG. 4, the power spectral density for pumps 102A–102D is shown in the initial step where all the power densities are at the same power level via controls 104A–104D by controlling the applied current or bias. Thus, the combined effective wavelength will be approximately $\bar{\lambda}_{PA} \approx 977.5$ nm. However, the power level can be monotonically decreased or increased, respectively, across the plural pumps so that, as shown in FIG. 5, the combined effective wavelength is approximately $\bar{\lambda}_{PA} \approx 972.5$ nm or, as shown in FIG. 6, the combined effective wavelength is approximately $\bar{\lambda}_{PA} \approx 982.5$ nm. Thus, the power level among the plural pumps may be varied in different degrees, relative to one another, so that a desired combined effective wavelength output to amplifier 114 is achieved that provides the best enhancement for the signal gain response or spectrum, preferably more flattened or with a reduced gain tilt angle.

A modification to the embodiment of FIG. 1 is the provision of a two stage amplifier with different doping compositions, such as, for example, an Er doped fiber coupled to an Er/Yb doped fiber, to produce gain flatness. When multiple 980 nm band pump sources are to pump the Er/Yb doped fiber, and these wavelengths start to "walk off" the Er absorption band, the Yb co-doped fiber will insure complete absorption as long as the pump wavelengths are not too short. Multiple 980 nm laser sources may be utilized for pumping the Er doped and Er/Yb doped hybrid pumped fiber amplifier to produce a gain flattened fiber amplifier having a signal profile extending from about 1542 nm to about 1562 nm. By employing multiple pumps in the 980 nm band for both fiber amplifier stages with independent adjustment of the pump powers, the gain flatness can be further broadened over the above mentioned signal profile.

Figure 7:
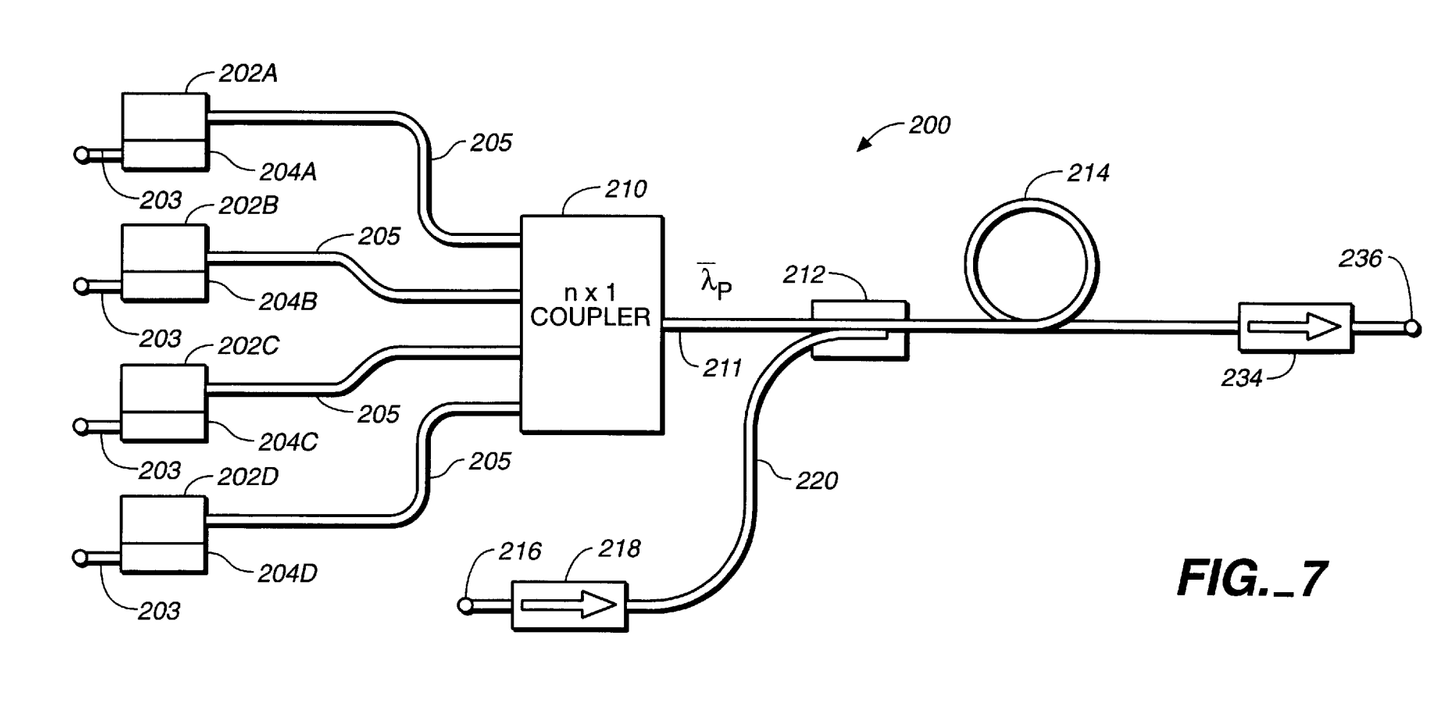

Reference is now made to FIG. 7 which illustrates a second more specific embodiment according to this invention. The variation of the output wavelengths of the individual pump modules in FIG. 7 is accomplished by heated control of the pump sources. In this case, stabilized gratings, such as gratings 103 and 123 in FIG. 2, are not necessary and if employed, the stabilized gratings would have to be broadband to permit changes in the output wavelengths controlled by the stabilized gratings. Changes in the individual pump module wavelengths would, in turn, change the effective combined output wavelength, $\bar{\lambda}_P$, providing for best enhancement for the signal gain response or spectrum, preferably more flattened or with a smaller gain tilt angle.

The embodiment of FIG. 7 is similar to the co-propagating pump portion of the embodiment of FIG. 1 except that the weighted average of the effective combined wavelengths of the multiple pump sources is adjusted by means of environmental temperature changes of the pump sources. Such environmental temperature changes to the pump sources may also include the device comprising their optical coupling, such as n×1 coupler 210, but for the purposes of explanation here, temperature adjustment is limited to the pump sources. In FIG. 7, amplifier system 200 comprises fiber amplifier 214 pumped by four co-propagating laser pumps 202A–202D having wavelength outputs of $\lambda_{P1}$, $\lambda_{P2}$, $\lambda_{P3}$ and $\lambda_{P4}$. Pumps 202A–202D may be comprised of semiconductor laser diodes of single mode or multimode output. The light outputs from pumps 202A–202D are combined via multimode fibers 205 in n×1 coupler 210 and their combined output is provided on multimode fiber 211. A signal at input 216 is provided as input to fiber amplifier 214 through optical isolator 218 in single mode fiber 220. Optical coupler 210 provides for optically coupling the light from multimode fiber 211 and single mode fiber 220 into fiber amplifier 214. As a specific example, although not as a limiting configuration in the practice of this invention, amplifier 214 may be comprised of an Er doped fiber and pumps 202A–202D may be laser diode pump modules at stabilized wavelengths of 970 nm, 975 nm, 980 nm and 985 nm. The input signals to be amplified may be a plurality of wavelength channels within the 1550 nm band. Amplifier 214 comprises a double clad fiber with an optical coupler 212 to launch the pump light into the inner cladding (pump core) of the fiber and signal 216 into the fiber core. Coupler 210 is commercially available, such as from Canstar of Canada. Examples of coupler 212 are the conventional use of dichroic mirrors and lens system, as known in the art, or as shown in FIG. 3 of U.S. Pat. No. 5,170,458, which is incorporated herein by reference. The amplified signal from amplifier 214 is provided, via optical isolator 234, at output 236.

An important aspect of this invention is that each of the pump sources 202A–202D are provided with separate heater sources 204A–204D, e.g., heaters or thermoelectric coolers, that are independently varied in operational temperature as an effective means for varying the combined effective wavelength, $\bar{\lambda}_P$, of the combined pump power at the output of optical coupler 210 for input to amplifier 214. Microprocessor 20 in FIG. 1 may be programmed to appropriately vary the power supplied to heater sources 204A–204D via input terminals 203 to vary the individual wavelengths of operation of one or more of heater sources 204A–204D. The combined effective wavelength, $\bar{\lambda}_P$, output to amplifier 214 can be adjusted through changing of the individual wavelengths of operation of the individual pump sources 202A–202D to provide a weighted average of the wavelength that provides for broadening of the signal gain response curve or reducing the gain tilt of the signal gain response curve.

In the previously described embodiments of this invention, operational changes in at least one, if not more, of the laser pump sources is exemplified by a change in power or temperature. However, it should be understood that the wavelength weighted average may also be changed by the termination of the operation of one or more of laser pump sources in favor of remaining operating pump laser source or sources. Such changes through switching on or off of a laser source can be accomplished through programmed operation of microprocessor 20.

Although the invention has been described in conjunction with one or more preferred embodiments, it will be apparent to those skilled in the art that other alternatives, variations and modifications will be apparent in light of the foregoing description as being within the spirit and scope of the invention. Thus, the invention described herein is intended to embrace all such alternatives, variations and modifications that may fall within the spirit and scope of the following claims.

What is claimed is:

1. A fiber amplifier having a predetermined nominal gain bandwidth and gain flatness, comprising:
   a plurality of laser pump sources having different wavelengths within an absorption band of the fiber amplifier with their outputs combined to provide a higher combined pumping power exhibiting a weighted average of the wavelengths of the laser pump sources for launching in at least one end of said fiber amplifier; and
   means to modify the weighted average of the combined wavelengths of the laser pump sources so as to broaden or flatten the predetermined nominal gain bandwidth of the amplifier.

2. The fiber amplifier of claim 1 wherein said modifying means comprises a power control connected to each of said laser pump sources to independently vary the power level of each laser pump source.

3. The fiber amplifier of claim 2 further comprises a controlled microprocessor to independently vary the power controls of said laser pump sources for determining the modified weighted average that optimally broadens the predetermined nominal signal gain bandwidth of said fiber amplifier.

4. The fiber amplifier of claim 3 wherein multiple wavelength input signals within the gain spectrum of said fiber amplifier are launched into said fiber amplifier to determined the overall modified signal gain spectrum of said fiber amplifier.

5. The fiber amplifier of claim 1 wherein said modifying means comprises a temperature control coupled to at least one of said laser pump sources to modify the weighted average of the wavelengths of the laser pump sources.

6. The fiber amplifier of claim 5 further comprises a controlled microprocessor to independently vary the temperature of said laser pump sources to provide a modified weighted average that optimally broadens the predetermined nominal signal gain bandwidth of said fiber amplifier.

7. The fiber amplifier of claim 6 wherein multiple wavelength input signals within the gain spectrum of said fiber amplifier are launched into said fiber amplifier to determined the overall modified signal gain spectrum of said fiber amplifier.

8. A WDM or DWDM communication system employing the fiber amplifier of claim 1.

9. A fiber amplifier having an active dopant along its fiber length providing a nominal signal spectral gain profile, and further comprising:
   a plurality of laser pump sources having different wavelengths within an absorption band of the fiber amplifier with their outputs combined to provide a higher combined pumping power exhibiting a weighted average of their outputs as combined and provide a scaled power output for launching in at least one end of said fiber amplifier;
   a power control connected to each of said pump sources to independently vary the power level of each laser pump source;
   said power controls separately adjusted to change the weighted average of the combined pump wavelength to enhance the nominal signal spectral gain profile in said fiber amplifier.

10. The fiber amplifier of claim 9 wherein a first portion of said laser sources are combined and launched into a first end of said fiber amplifier in the co-propagating direction of a signal to be amplified by said fiber amplifier and a second portion of said laser sources are combined and launched into a second end of said fiber amplifier in the counter-propagating direction of the signal to be amplified by said fiber amplifier.

11. The fiber amplifier of claim 9 wherein said enhancement is a flattening of said signal gain profile.

12. The fiber amplifier of claim 9 wherein said enhancement is a decrease in the gain tilt of said signal gain profile.

13. A fiber amplifier having an active dopant along its fiber length providing a nominal signal spectral gain profile, and further comprising:

a plurality of laser sources having different wavelengths within an absorption band of the fiber amplifier with their outputs combined to provide a higher combined pumping power exhibiting a weighted average of their outputs as combined and provide a scaled power output for launching in at least one end of said fiber amplifier;

a temperature control coupled to each of said pump sources to independently vary the wavelength of each laser pump source;

said temperature controls separately adjusted to change the weighted average of the combined pump wavelength to enhance the nominal signal spectral gain profile in said fiber amplifier.

14. The fiber amplifier of claim 13 wherein said enhancement is a flattening of said signal gain profile.

15. The fiber amplifier of claim 13 wherein said enhancement is a reduction in gain tilt of said signal gain profile.

16. A fiber amplifier having a nominal gain spectrum comprising:

a plurality of pump laser sources operating at different wavelengths within an absorption band of the fiber amplifier with their outputs combined to provide a higher combined pumping power;

means to combine the optical power from said sources to provide their combined output for pumping the amplifier and producing a weighted average of the combined wavelengths of said sources, and means to produce an operational change to at least one of said pump laser sources to change the weighted average of the combined wavelengths to produce a broader gain spectrum than said nominal gain spectrum.

17. The fiber amplifier of claim 16 wherein said operational change of said combining means is a change in power output of at least one of said pump laser sources.

18. The fiber amplifier of claim 16 wherein said operational change is terminating the operation of at least one of said pump laser sources in favor of remaining operating pump laser sources.

19. The fiber amplifier of claim 16 wherein said operational change is tuning the wavelength of operation of at least one of said pump laser sources.

20. The fiber amplifier of claim 19 wherein said wavelength tuning is accomplished by a change in operational temperature of said at least one pump laser source.

21. The fiber amplifier of claim 16 wherein said operational change produces a reduction in gain tilt of the fiber amplifier.

22. The fiber amplifier of claim 16 wherein said operational change produces a flattened gain spectrum relative to said nominal gain spectrum.

23. The fiber amplifier of claim 16 wherein said operating wavelengths of said pump laser sources include at least one pump laser source which is separated in wavelength from at least one other pump laser source by at least 5 nm.

24. A method of broadening or flattening the gain profile of a fiber amplifier comprising the steps of:

providing a plurality of laser pump sources operating at different wavelengths within an absorption band of the fiber amplifier, the combined light output of the pump sources launched into the fiber amplifier; and adjusting a weighted average of the wavelengths of the laser pump sources until a modified weighted average is achieved that optimally broadens or flattens the gain profile.

25. The method of claim 24 further comprising the step of adjusting the power level of the individual laser pump sources to achieve the optimized weighted average.

26. The method of claim 24 further comprising the step of adjusting the temperature level of the individual laser pump sources to achieve the optimized weighted average.

27. The method of claim 24 comprising the further step of:

utilizing the fiber amplifier in a DWDM communication system.

28. The fiber amplifier of claim 1 wherein the wavelength of said pump sources is controlled by an output grating providing feedback that stabilizes operation of its respective pump source at a designated wavelength.

29. The fiber amplifier of claim 16 wherein the wavelength of said pump laser sources is controlled by an output grating providing feedback that stabilizes operation of its respective pump source at a designated wavelength.

* * * * *